United States Patent [19]
Knobel

[11] 4,062,316
[45] Dec. 13, 1977

[54] FLEXIBLE INSTRUMENT POINTER

[76] Inventor: Max Knobel, 453 Beacon St., Boston, Mass. 02115

[21] Appl. No.: 729,355

[22] Filed: Oct. 4, 1976

[51] Int. Cl.² .................. G01D 13/22; G01D 13/26
[52] U.S. Cl. .................... 116/136.5; 58/126 D; 116/DIG. 6; 324/154 PB
[58] Field of Search .......... 116/129 R, 136.5, DIG. 6; 58/126 D; 324/154 PB

[56] References Cited

U.S. PATENT DOCUMENTS

| | | | |
|---|---|---|---|
| 611,723 | 10/1898 | Weston | 116/136.5 |
| 1,070,310 | 8/1913 | Weston | 116/136.5 |
| 1,743,354 | 1/1930 | Johnson | 116/136.5 |
| 2,100,833 | 11/1937 | Bruckel et al. | 116/136.5 |
| 2,440,861 | 5/1948 | Lamb | 116/136.5 X |
| 2,926,306 | 2/1960 | Stegner | 116/136.5 X |

FOREIGN PATENT DOCUMENTS 914,194   12/1962   United Kingdom .............. 116/136.5

Primary Examiner—Daniel M. Yasich
Attorney, Agent, or Firm—Morse, Altman, Oates & Bello

[57] ABSTRACT

A flexible pointer is provided for use as a movable indicator, hand or arm on such devices as dial indicators, movable arms for electrical contacting devices, and the like. The pointer is comprised of a pair of strips of spring material joined at their upper ends and spread apart at their lower ends in a generally triangular shape, the outer free end being the indicating portion, while the wider, inner end is connected to a pivot or other movable support. The triangular configuration allows the pointer to bend due to rapid acceleration or overtravel and to return to its original shape without damage.

5 Claims, 7 Drawing Figures

FLEXIBLE INSTRUMENT POINTER

BACKGROUND OF THE INVENTION

1. Field of the Invention

This invention relates generally to movable indicators, such as pointers, hands, arms, and the like, as are found on electrical meters, gauges and other instruments, and more particularly is directed towards a new and improved pointer adapted to bend under applied pressure and to return to its original condition when the pressure is removed.

2. Description of the Prior Art

In many instruments, including dial indicators, electrical meters, clocks, and the like, a movable member, such as a pointer, hand or arm, is employed to move along a scale between contact points or the like. Many such instruments are quite delicate in nature and operate under very little force. For such instruments the pointer is made very light in weight in order to avoid overshoot due to inertial forces. Such pointers are easily damaged if subjected to excessive acceleration or to overtravel between contact points.

It is an object of the present invention to provide a movable member, such as a pointer, hand or contact arm, which is stiff during normal operation but is free to bend to a substantial extent as the result of bending forces, such as excessive acceleration, overtravel, or the like. It is another object of this invention to provide a lightweight, movable pointer, hand, or arm which is not damaged by bending and returns to its original position quickly and with substantially no vibration.

SUMMARY OF THE INVENTION

This invention features a movable member such as a pointer, hand, arm or the like in which one end is connected to a driving member while the outer, free end moves across a scale on a dial face between contact points or the like. The pointer is formed by a pair of thin strips of spring material joined in a triangular shape, the outer free end being the apex, while the inner end is connected to the driving member. The triangular shape provides stiffness to the pointer during normal operation, but allows the pointer to bend under excess acceleration or if the pointer overtravels between contact points or the like. The pointer returns to its original shape when the bending pressure is relieved.

DETAILED DESCRIPTION OF THE PREFERRED EMBODIMENTS

Figure 1:
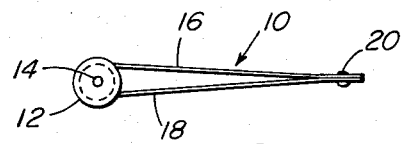
FIG. 1 is a view in front elevation of a flexible instrument pointer made according to the invention.
Figure 2:
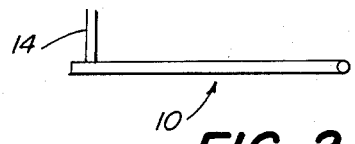
FIG. 2 is a top plan view thereof.
Figure 3:
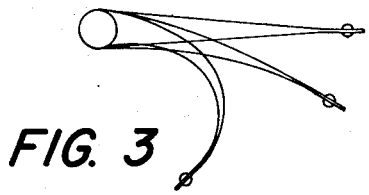
FIG. 3 is a front elevation showing the pointer bent to different extents.

Referring now to the drawings and to FIGS. 1 through 3 in particular, there is illustrated a pointer 10 useful as a movable member on various types of instruments, such as the pointer for a dial indicator, the hand of a clocking instrument, or an arm in an electrical contact device, for example. The pointer 10 of FIGS. 1 through 3 is mounted to a hub 12 carried on the end of a shaft 14 which will rotate in response to a particular condition, such as a measurement being made on a dial indicator, for example. The pointer 10 is comprised of a pair of strips 16 and 18 of a spring material connected together at their outer free ends as by a rivet 20 or the like. Preferably, the ends of the rivet should be rounded to facilitate movement of the pointer end as will appear more fully below. The inner ends of the strips 16 and 18 are spread apart from one another and connecteed to opposite sides of the hub 12 to form the triangular shaped pointer 10.

If the pointer were made with only one strip, it would be extremely flimsy and too easily bent, but by bracing two strips in the triangular configuration shown, the pointer becomes quite stiff yet can be bent when subjected to the proper force. Once the pointer has started to bend, it then bends very easily and can be bent as far as indicated by the several positions shown in FIG. 3 without harm to the pointer. Once the bending pressure has been relieved, the pointer will snap back to its original shape of FIG. 1 and come to rest almost immediately.

The strips 16 and 18, if forming a pointer for a typical dial indicator, for example, may be fabricated of spring steel 0.002 inch thick and 1/16 inch wide, with a base width W of 3/16 inch and the length L of 1½ inches. Obviously, these dimensions are only by way of example and may be varied over a wide range depending upon the particular application for the pointer.

Figure 4:
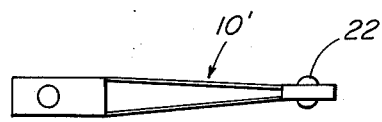
FIG. 4 is a view in front elevation showing a modification of the invention.

The ease of bending of the pointer depends on the base width W in relation to the length L and, of course, the strip dimensions and material. The pointer may be bent more easily with the sharp point and the smaller values for W. Where only slight bending is required, a trapezoid shaped pointer 10', such as shown in FIG. 4, may be employed. A pointer of this configuration is somewhat stiffer than the pointer of FIG. 1 and may be utilized to carry electrical contacts 22 and 24, for example. Such contact carrying pointers will withstand considerable overtravel yet be more stiff and steady when first engaging the opposing contacts than any single strip arm.

Figure 5:
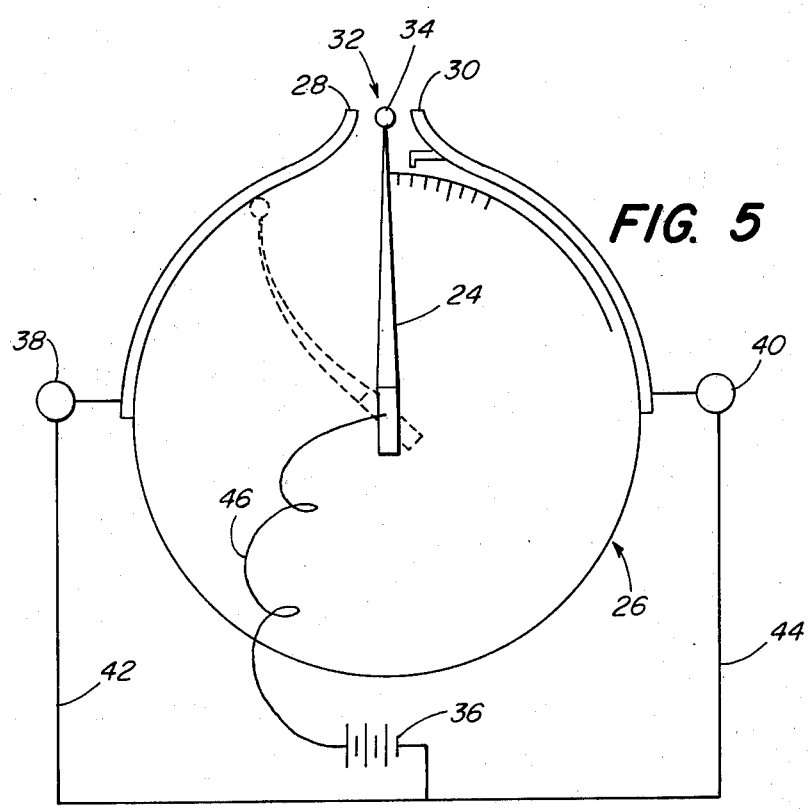
FIG. 5 is a front elevation somewhat schematic showing the pointer in use on a dial indicator having electrical contacts.

Referring now to FIG. 5 of the drawings, as illustrated, a flexible pointer 24 is made according to the invention and used in a dial indicator 26 for the purpose of moving between a pair of electrical contacts 28 and 30. A device of this nature is employed to gauge various types of products and to produce a signal in the event that the product being gauged is oversize or undersize. The contacts 28 and 30 may take the form of conductive arcuate segments, as illustrated in FIG. 5, the upper ends of which are spaced apart to form a gap 32 between which the end of the pointer is free to move. As long as the pointer remains within the gap, the parts being gauged are within the proper size range. However, should the part be undersized, for example, the pointer 24 will deflect to the left, striking the contact 28, and if the motion is excessive the pointer will bend, as shown by the dotted line in FIG. 5.

When the conductive pointer tip, which preferably is in the form of a ball 34, touches the contact 28 a circuit is closed to a power source 36, thereby illuminating one of two lights 38 and 40. The circuit is completed through leads 42 and 44 connecting the lights 38 and 40 to the battery 36 and a lead 46 connecting the battery 36 to the pivot end of the pointer 24. Once the outsize part is removed, the pointer 24 will return to its normal position between the gap and will straighten immediately. By providing a ball 34 on the tip of the pointer, the pointer will ride much more easily against the inside surface of the arcuate contacts 28 and 30.

Figure 7:
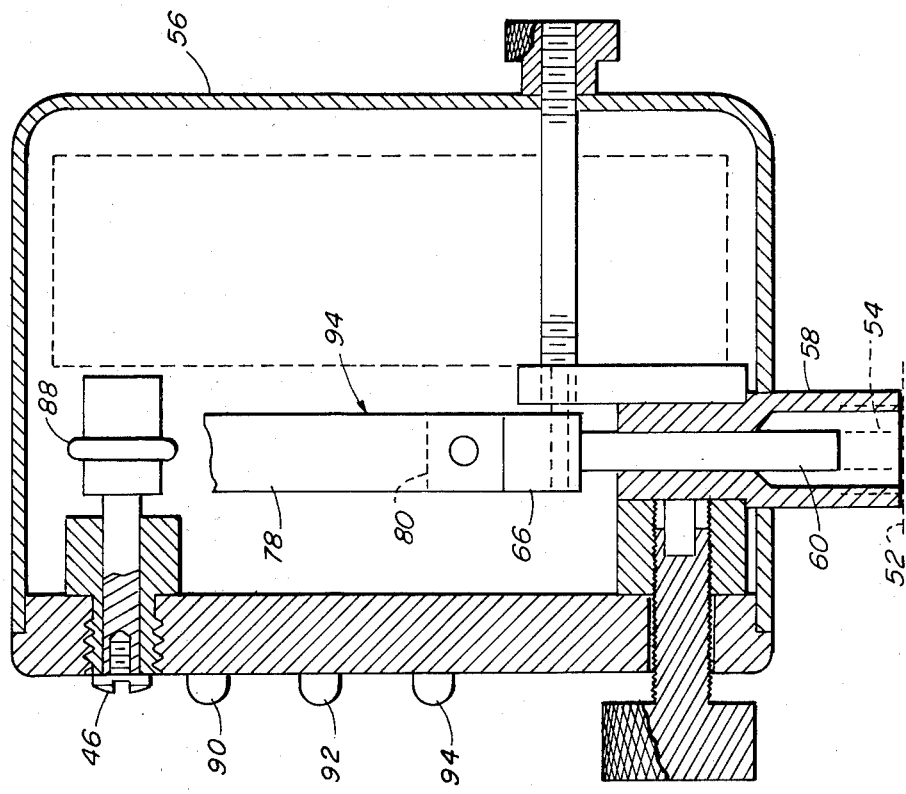
Figure 6:
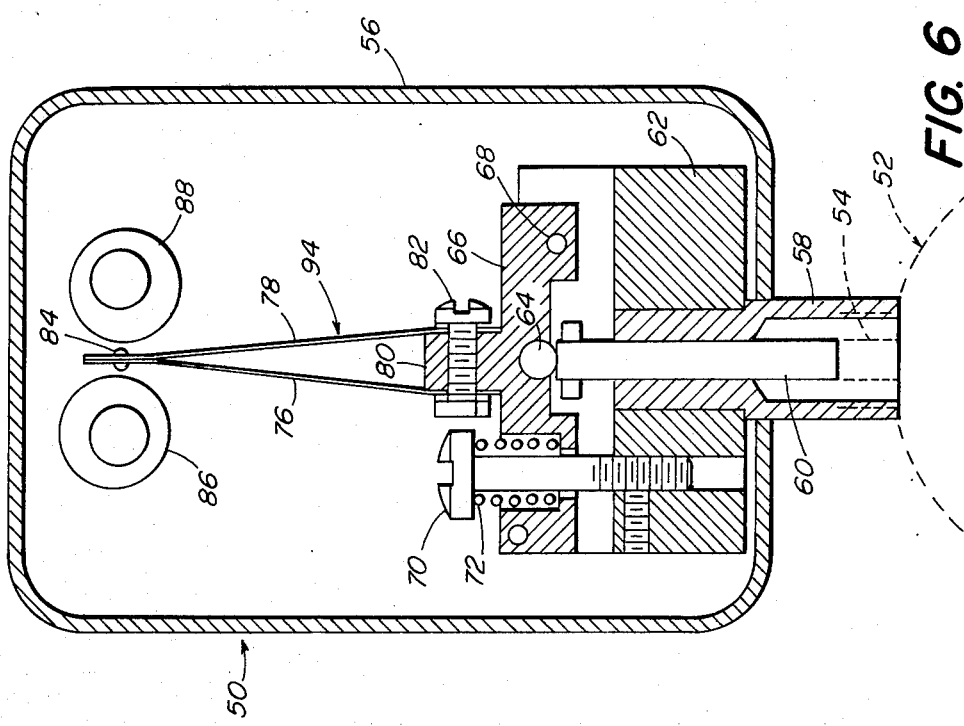
FIG. 6 is a sectional view in front elevation showing a dial indicator attachment utilizing a flexible contact arm according to the invention, and, FIG. 7 is a sectional view in side elevation thereof.

Referring now to FIGS. 6 and 7 of the drawings, there is illustrated a further modification of the invention and in this embodiment an attachment 50 is provided for use in connection with a standard dial indicator 52 shown in outline form in FIG. 6. The attachment 50 is fitted to the top of the dial indicator about a stem 54 formed on the end of the rack of the indicator which moves up and down with the gauging action of the anvil.

The attachment includes a housing 56 having a tapped socket 58 adapted to screw onto the dial indicator 52 to bring to bear a rod 60 into contact with the stem 54. The rod 60 passes through a block 62 within the housing to engage a ball 64 mounted to a spring-loaded arm 66 pivoted at 68. The opposite end of the arm 66 is connected to the block 62 by means of a screw 70 which is provided with a spring 72 through which the arm is spring loaded. The arm carries a pointer 74 comprised of flexible thin bands 76 and 78, the lower ends of which are attached to a boss 80 by a screw 82, while the upper ends are joined together as by a rivet 84, the opposite ends of which provide electrical contacts. The free end of the pointer extends into the gap between a pair of adjustable contacts 86 and 88, the gap of which may be selectively varied as required. In operation, the pointer 74 is moved to the right or to the left as the arm 66 pivots and responds to any linear motion of the rod 60 and the stem 54. The contacts 86 and 88 are electrically wired to illuminate one of a group of lamps 90, 92 and 94 on the face of the housing. Typically, the center lamp 92 will be green to indicate that the part to be engaged is within the proper size range, while the lamps 90 and 94 may be amber and red, for example, and are illuminated when the pointer touches either contact to indicate oversize or undersize. The gap between the contacts 86 and 88 may be adjusted by means of an adjustment screw 96 provided with an eccentric inner portion carrying the contacts 86 and 88.

As before, in the event that the pointer 74 is deflected beyond its normal range, the pointer will bend under applied pressure without damage and will return to its normal straight position once the needle returns to the gap.

Having thus described the invention, what I claim and desire to obtain by Letters Patent of the United States is:

1. A flexible pointer mountable to a movable member such as the shaft of a dial indicator or the like and arranged to contact at least one fixed element on the indicator, comprising
   a. a hub adapted to be mounted to said member for movement therewith,
   b. a pair of elongated legs connected at their inner ends to said hub in spaced opposing relation to one another,
   c. said legs being of flat spring strip material and extending outwardly from said hub towards one another with a flat face of one leg being opposite a flat face of the other leg,
   d. the outer ends of said legs being joined to one another and closer together than the spaced inner ends thereof to give a selected stiffness to the pointer,
   e. the length of said elongated legs relative to the width of said spaced inner ends of the legs allowing extreme bending when the fixed element is engaged thereby wherein the pointer will resiliently return to its original shape when the pointer disengages the fixed element.

2. A flexible pointer, according to claim 1, wherein said legs define a triangle.

3. A flexible pointer, according to claim 1, wherein said legs define a trapezoid.

4. A flexible pointer, according to claim 1, wherein said legs are electrically conductive.

5. A flexible pointer, according to claim 1, including a spherical head at the tip of said pointer.

* * * * *